United States Patent [19]

Ballestrazzi et al.

[11] 4,019,307
[45] Apr. 26, 1977

[54] WELDING AND CUTTING DEVICE FOR PACKAGING MACHINES

[75] Inventors: Aris Ballestrazzi; Lamberto Tassi; Gianni Tosarelli, all of Vignola (Modena), Italy

[73] Assignee: Situno Holding SA, Luxembourg, Luxembourg

[22] Filed: Jan. 16, 1976

[21] Appl. No.: 649,578

[30] Foreign Application Priority Data

Jan. 17, 1975   Italy .................................. 19387/75

[52] U.S. Cl. ............................................ 53/182 R
[51] Int. Cl.² ....................................... B65B 51/14
[58] Field of Search ..................................... 53/182

[56] References Cited

UNITED STATES PATENTS 3,618,740   11/1971   Taverna ........................ 53/182 X

FOREIGN PATENTS OR APPLICATIONS 2,008,595   9/1970   Germany ............................. 53/182
1,067,166   5/1967   United Kingdom ................. 53/182

Primary Examiner—Travis S. McGehee
Attorney, Agent, or Firm—Cushman, Darby & Cushman

[57] ABSTRACT

In a packaging machine of the kind in which a tubular film is wrapped around the articles to be packaged as they are advanced over a conveyor belt and the film is heat-welded and severed, the improvement consisting in that the welding and the counter-welding rods are vertically reciprocated between respective inactive positions and an approached position whereat both rods cooperate to effect the welding and the film-severing. The height adjustment to allow for different heights of the articles to be packaged is thus greatly facilitated and the film pull reduced.

3 Claims, 9 Drawing Figures

WELDING AND CUTTING DEVICE FOR PACKAGING MACHINES

This invention relates to a novel and improved device for welding and cutting in a packaging machine.

Packaging machines are known in which the products as fed in succession over a conveyor belt and wrapped by a continuous tubular film (usually obtained by folding the edges of a planar film) are fitted with respective wrappers which are closed and separated from each other by means of appropriate devices which are adapted to effect, concurrently, the severing of the film between an article and the next and the welding of one film end at the two sides of the severing cut so carried out.

Such devices are usually constituted by a welding rod and a counter-welding rod as arranged on opposite sides with respect to the film to be welded and can be approached to one another so as to provide a temporary engagement condition for welding and severing of the film therebetween.

To such a class belongs the welding and severing device as disclosed in the Italian patent specification No. 858,011 which is specifically directed to the solution of the problem of carrying out the welding and severing operation when having both the film and the conveyor belt in motion.

The latter device, along with its numerous favourable features, for its being based on a happy combination of a reciprocal horizontal motion of a carriage in the direction of development of the conveyor belt and a vertical reciprocation of a welding rod carried by said carriage (so that the welding rod virtually goes over an elliptical path relative to the film), while a counter-welding rod also carried by the carriage remains stationary just below the film to be welded, has the defect of lending itself very little to the welding of films which contain products having a comparatively high height. Inasmush as the counter welding rod remains stationary below the film, in fact, the welding rod must, prior to meeting the counter-welding rod in welding arrangement, put in tension the upper edge of the film so as to approach it to the lower edge. This fact involves, on the one hand, an undesirable backward motion of the preceding article and a so-much undesirable and consequent shrinking of the lower edge of the film between the article and its next and, on the other hand, a considerable tensioning of the film upper edge, which can be such as the welding rod produces the complete severing of the film prior to operating the welding of the upper and lower edges (so that the wrappers placed around the articles remain open).

An object of the present invention is thus to provide a welding and severing device which lends itself equally well to products of any height.

According to the invention this object is achieved by means of a device which is characterized in that both the welding and counter-welding rods can be actuated with a vertical reciprocation between respective at rest position and a close position of mutual engagement.

Stated another way, while according to the above mentioned patent only the welding rod is moved and is inserted between an article and the next while the counterwelding rod remains stationary beneath the film, according to this invention both the rods are moved the one towards the other and provide a condition of much lesser tensioning of the film, the latter being virtually exempt from the above indicated defects.

Preferably, the level at which the condition of mutual engagement between the two rods is obtained will be adjustable, so as to render the device promptly adaptable to products the height of which is anyhow variable. While the at rest position of the counter-welding rod will normally be the one immediately below the film to be welded, the at rest position of the welding rod can be varied in correspondence with the position of engagement of the counter-welding rod (and if so the stroke of the welding rod will be kept constant) or it can be kept constant (and if so the stroke of the wending rod will be varied).

The foregoing and other features of the present invention, as well as the advantages stemming therefrom, will be better understood with reference to the accompanying drawings, wherein:

FIG. 1 diagrammatically shows in perspective view the essential component parts of a preferred embodiment of the device according to the invention.

Figure 1:
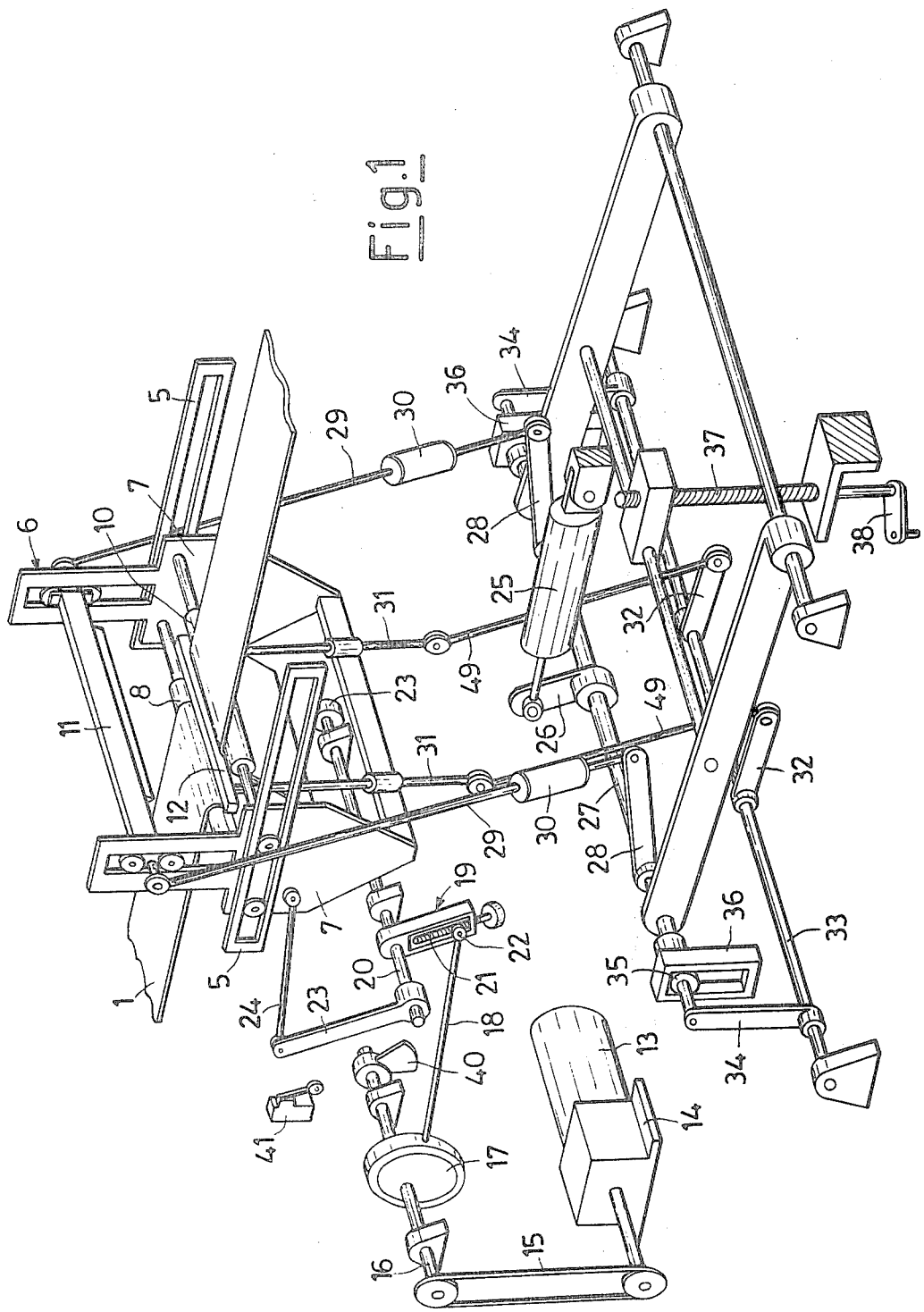
Figure 4:
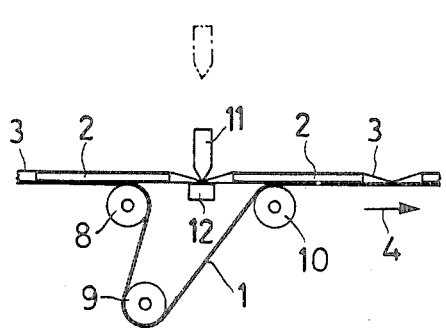
FIGS. 4 and 5 show two different possibilities of operation of the device of FIGS. 1 and 2.
Figure 5:
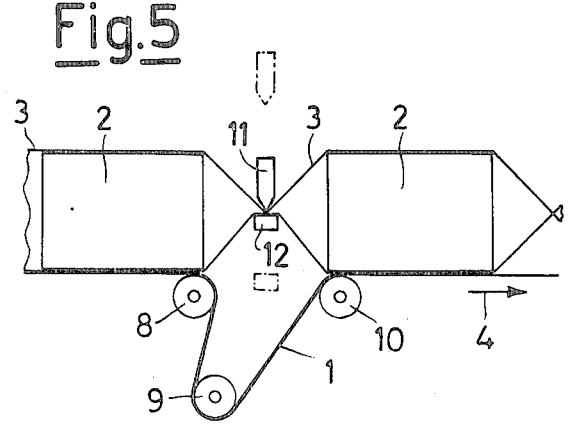

FIG. 1 shows the conveyor belt 1 of a packaging machine on which the articles to be packaged are conveyed and arranged one after another at regular intervals and already wrapped by a continuous tubular film of a plastics material (see FIGS. 4 and 5 wherein 2 indicates the articles, 3 the film and the arrow 4 the direction of feed of the conveyor belt 1).

At both sides of the conveyor belt 1 there are provided two fixed horizontal guideways 5, in which there is guided a carriage generally indicated at 6. The carriage is formed by two side plates 7 rigidly connected to one another and by three idle rollers 8, 9 and 10 on which the belt 1 is wrapped in the way as clearly shown in FIGS. 4 and 5, that is so as to be temporarily deflected to skip the welding area which is formed by two rods 11 and 12 carried by the carriage 6 in a vertically movable way for the reciprocal approaching and spreading, the former being the welding rod which is above the film to be welded and the latter is the counter-welding rod which is below the film. The welding rod is made in a conventional manner and is basically formed by an electrically heated wire which is capable of effecting the complete severing of the film and the concurrent welding of the film ends at the sides of the cut.

To control the movements of the carriage an electric motor 13 is provided, having a reducing gear 14 which, in addition to controlling the advance of the conveyor belt 1, imparts through a chain 15 a continuous rotary motion to a shaft 16 carrying an eccentric 17. The latter is connected through a clevis 18 to a lever 19 which is affixed to a second shaft 20 which is thus oscillated around its axis. More exactly, the lever 19 carries a screw 21 which is passed through a slider 22 as guided in the lever. By turning the screw 21 it is possible to displace the slider 22 to approach it to, or to draw it away of, the axis of the shaft 20. Since the clevis 18 is pivoted to the slider 22, it is apparent that by acting on the screw 21 it is possible to adjust the amplitude of oscillation of the shaft 20 and thus the stroke of the carriage 6, which is connected to the shaft 20 through two couples of articulated levers 23 and 24.

The welding rod 11, in its turn, is controlled by a mechanism which comprises the pneumatic ram 25 (which can be possibly replaced by another kind of drive), which is capable of controlling through a crank 26 the oscillation of a shaft 27, to which two cranks 28 are fastened, which are connected to the ends of the welding rod 11 by liks 29 in which springs 30 are inserted adapted to balance a desirable difference between the stroke which can be effected by the welding rod 11 and the stroke which would otherwise be controlled by the cranks 28.

The same oscillating shaft 27 is also entrusted with the control of the counter-welding rod 12, which is connected by rods 31 and 49 to a cranks 32 integral with a shaft 33, to which are also integrally fastened cranks 34 carrying respective followers 35, the latter being slidably inserted in specially provided longitudinal windows formed in boxes 36, these being eccentrically affixed to the shaft 27.

Figure 2:
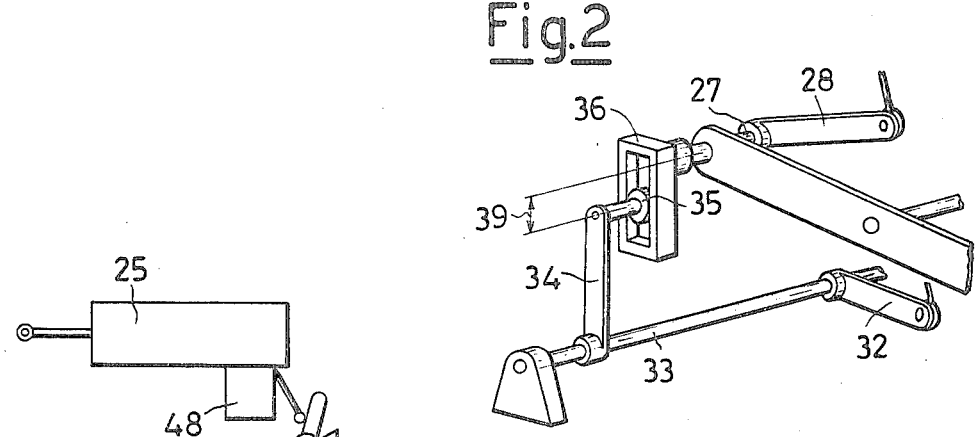
FIG. 2 shows in the form of a detail how it is possible to obtain the adjustment of the position of engagement between the welding rod and the counter-welding rod.

As can be seen in FIGS. 1 and 2, the followers 35 can be differently positioned in the windows of the boxes 36, and this takes place as a function of a level adjustment of the shaft 27 which can be effected by actuating an adjustment screw 37 by means of a crank 38. This level adjustment is such that the shaft 27 can become coaxial with the followers 35 (FIG. 1) or in various positions relative thereto (FIG. 2 where the arrow 39 indicates the misalignment), that which means that in the former case the oscillatory motion of the shaft 27 has no influence on the shaft 33 and the counter-welding rod 12 remains stationary in its at rest position immediately below the film 2 whereas the welding rod 11 approaches it until giving rise of an engagement condition adapted to permit that the welding may be carried out with the severing of the film (a solution which is adopted for packaging, as in FIG. 4, of articles having a reduced height), whereas in the latter case the oscillatory motion of the shaft 27, which retains its amplitude but varies its limits as a function of the adjustment as effected with the screw 37, is accompanied by a similar oscillatory motion of the shaft 33 about its axis and thus of the counter-welding rod 12 between the abovementioned at rest position and a raised position such as that shown in FIG. 5.

Figure 6:
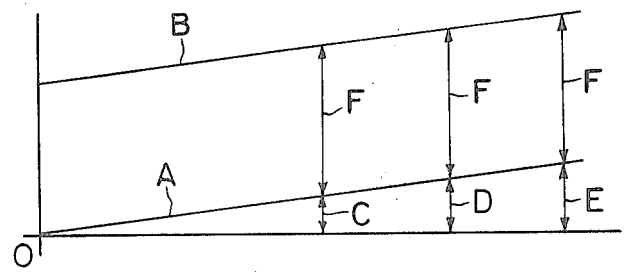
FIG. 6 is a plot explaining the several possibilities of behaviour of the device and especially that of the welding and counter-welding rods as a function of the adjustment effected.

Considering the combination of the motions impressed to the carriage 6, the welding rod 11 and the counter-welding rod 12, it is apparent that, while the carriage 6 carries out horizontal oscillations having an amplitude which can be adjusted by the screw 21, the welding rod 11 carries out vertical oscillations of constant amplitude between two variable end positions, namely a lifted at rest position and the lowered position of engagement for welding with the counter-welding rod 12, that latter, in its turn, being stationary in the lowered at rest position, or it carries out, also, vertical oscillations of variable amplitude between the at rest position aforesaid and a lifted position of engagement with welding rod 11 consistently with the adjustment imparted by the screw 37 (FIGS. 1, 2, 4 and 5). In FIG. 6 the straight lines A and B show, respectively, the variations of the point of engagement between the rods 11 and 12 of the point of maximum lift of the rod 11 as a function of the adjustment which has been carried out, the condition of FIG. 1 being that having the coordinates 0, 0 wherein the axis of the followers 35 coincides with that of the shaft 27 and the counter-welding rod 12 is consequently situated immediately below the film (FIG. 4). The arrows C, D, E and F, indicate, in turn, the first three, the variable amplitude of the stroke as effected by the counter-welding rod 12 consistently with the adjustment which has been imparted and, the fourth, the constant amplitude of the stroke as simultaneously effected by the welding rod 11.

As a result, the welding rod 11 effects relatively to the belt 1 a periodical motion of elliptical outline which leads it to accompany the feed motion of the belt during its portion of maximum depression and thus to remain in contact with the counter-welding rod 12 for a time which is long enough as to secure the exact performance of both the welding and severing. In its turn, the counter-welding rod is moved horizontally only together with the carriage 6 or it also effects, relative to the belt 1, a periodical motion of elliptical outline having the same feature as that of the welding rod. This fact enables to retain the features which were characteristic of the above mentioned patent No. 858,011 while securing a variability of level of the position of engagement between the two welding and counter-welding rods, which permits the perfect adaptation of the device to the welding of films for packaging articles of various height (FIGS. 4 and 5).

Figure 3:
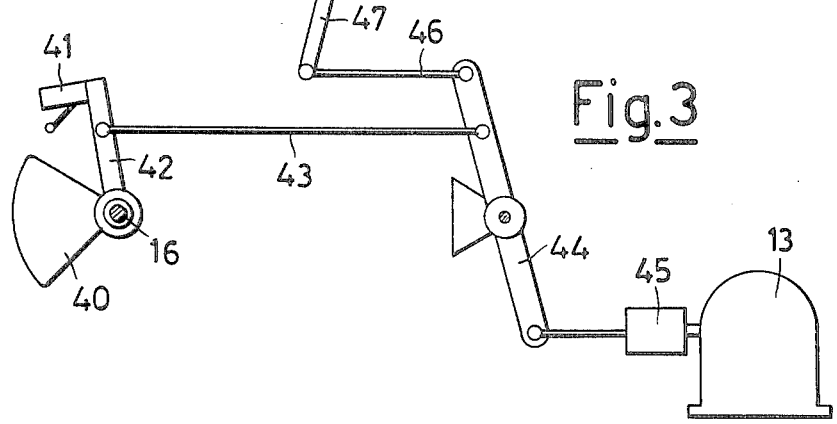
FIG. 3 shows another interesting detail of the device shown in FIGS. 1 and 2.

It should be noted that, as a result of the variable height of the product to be packaged, it may be advisable, from the point of view of the output of the packaging machine, to vary from time to time the advance speed of the belt 1. This fact, however, imposes an appropriate adaptation of the instant of start of the down strokes of the welding rod 11, in the sense of advancing it if the speed is increased and vice versa. Since the starting instance of such down strokes is, as usual, defined by the periodical engagement with a cam of a microswitch 41 for actuating the ram 25 (FIG. 1), according to the invention, it has been found advisable to modify the position of the microswitch 41 as a function of the speed of the motor 13. This has been obtained, in practice, by mounting the microswitch 41 on a lever 42 pivoted to the shaft 26 and by connecting, through a rod 43, the latter lever to a second lever 44, the position of which is caused to be a function of the speed of the motor 13 with the insertion of an appropriate speed-position transducer 45 (FIG. 3). As can be seen in FIG. 3 itself, the variable position of the lever 44 is also exploited, with the aid of a rod 46, a lever 47 and a flow regulator 48, to increase the actuation speed of the ram 25 and thus of the rods 11 and 12, as the speed of the conveyor belt 1 is increased.

Figure 7:
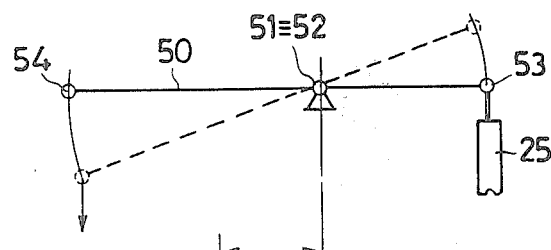
FIGS. 7 and 8 show in two different operational conditions a different kind of adjustment which can be used to vary the height of the engagement position between the welding rod and the counter-welding rod.
Figure 8:
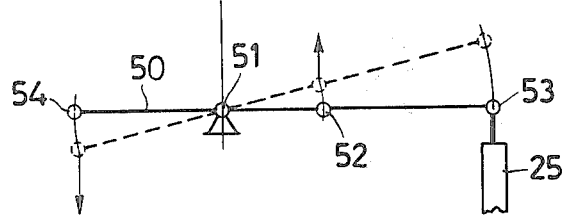
Figure 9:
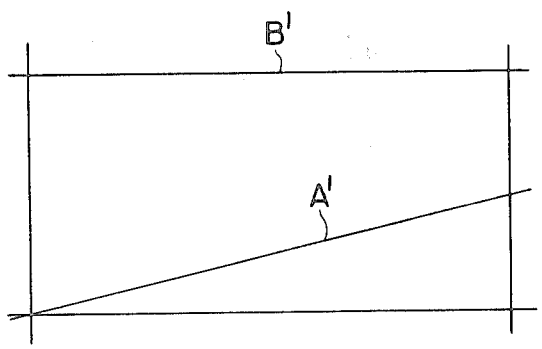
FIG. 9 is a plot showing the results which can be obtained with the adjustment means as shown in FIGS. 7 and 8.

Lastly, FIGS. 7 and 8 show, in different operative conditions, a different approach which can be adopted to obtain the desired variation of the position of engagement between the rods 11 and 12. Such an approach provides a lever 50, the pivotal point of which, 51, can be displaced from the position of FIG. 7, where it coincides with the point 52 of application of a force to the counter-welding rod 12, to a different position, for example such as that of FIG. 8 (the arrow 55 indicates the displacement). On considering 53 the point of application of the force of the ram 25 and 54 the point of application of the force to the welding rod 11, it is apparent (as shown in FIG. 9), that, by gradually shifting the pivotal point 51 from the position of FIG. 7, gradually increases the vertical stroke of the counter-welding rod 12 (line A' of FIG. 9) while the stroke of the welding rod 11 is correspondingly decreased, the point of maximum lift of the latter rod being now a constant (line B' of FIG. 9). Also in this way there has been obtained the basic result of varying the height of the position of engagement between the welding and counter-welding rods.

What we claim is:

1. A device for welding and severing for packaging machines of the kind in which the products to be packaged are arranged in succession on a conveyor belt and wrapped by a continuous tubular film of a plastics material, comprising a carriage which is moved with a horizontal reciprocation in the direction of movement of the conveyor belt, a welding rod and a counter-welding rod carried by said carriage on opposite sides with respect to said tubular film and capable of approaching to each other to provide a temporary condition of engagement for welding and severing of the film inserted therebetween first actuation means adapted to impress on the counterwelding rod a reciprocal vertical motion between an at rest position immediately below the tubular film and a variable lifted position and second actuating means adapted to impress on the welding rod a vertical reciprocation of constant amplitude between a lifted at rest position and a depressed position of mutual engagement for welding and severing with said counter-welding rod when the latter is in the lifted position, whereby the vertical position of mutual engagement is adjustable, said first and second actuating means comprising respective control shafts having a rotary reciprocal motion and so coupled to each other that a rotary reciprocation of constant amplitude impressed on the control shaft of the welding rod produces a rotary reciprocation of the control shaft of the counter-welding rod having an amplitude which is varied as the distance between the axes of the shafts is varied, and means for temporarily deflecting the conveyor belt in correspondence with said carriage so that the belt does not pass through the gap between said welding and counter-welding rods.

2. A welding and severing device according to claim 1, characterized in that said vertical reciprocation as imparted to the welding rod has an amplitude which is variable complementarily to that of the counter-welding rod.

3. A welding and severing device according to claim 2, characterized in that said first and said second actuating means comprise a shiftable-fulcrum lever adapted to transfer a single drive to both rods.

* * * * *